United States Patent [19]

Perkins

[11] 4,451,064
[45] May 29, 1984

[54] TRICYCLE

[76] Inventor: Robert D. Perkins, 41 Roxborough St. East, Toronto, Ontario, Canada, M4W 1V5

[21] Appl. No.: 397,366

[22] Filed: Jul. 12, 1982

[51] Int. Cl.³ .......................... B60K 5/04; B60M 3/00
[52] U.S. Cl. .................................... 280/259; 280/269; 280/282
[58] Field of Search ............... 280/269, 267, 261, 259, 280/282; 180/251

[56] References Cited

U.S. PATENT DOCUMENTS

| | | | |
|---|---|---|---|
| 316,047 | 4/1885 | Marble | 280/261 |
| 341,237 | 5/1886 | Healey | 280/238 |
| 906,293 | 12/1908 | Robinson | 280/261 |
| 3,429,584 | 2/1969 | Hendricks | 280/261 |
| 3,858,730 | 1/1975 | Oswald | 180/251 X |
| 3,921,467 | 11/1975 | Matsuura | 280/261 X |
| 4,108,460 | 8/1978 | Silva | 280/236 |

FOREIGN PATENT DOCUMENTS 831200  5/1838  France .
333575  4/1903  France .
9538  of 1886  United Kingdom .

OTHER PUBLICATIONS

"Bicycles & Tricycles"-An Elementary Treatise on their Design and Construction by Archibald Sharp, B.Sc., The MIT Press, Cambridge, Massachusetts, 1977.

Primary Examiner—John A. Pekar
Attorney, Agent, or Firm—Ridout & Maybee

[57] ABSTRACT

A tricycle is disclosed having a pair of laterally spaced rear wheels and a front wheel which has a central hub and which is mounted for free rotation on the front end portion of the frame. Rider operable means for driving at least one of the rear wheels comprises a chain drive mechanism including a driven sprocket operably connected to said at least one rear wheel, and a drive sprocket journalled for rotation independently of the front wheel about a horizontal axis which is disposed through the hub of the front wheel. The axle of the drive sprocket is provided with foot pedal cranks.

9 Claims, 8 Drawing Figures

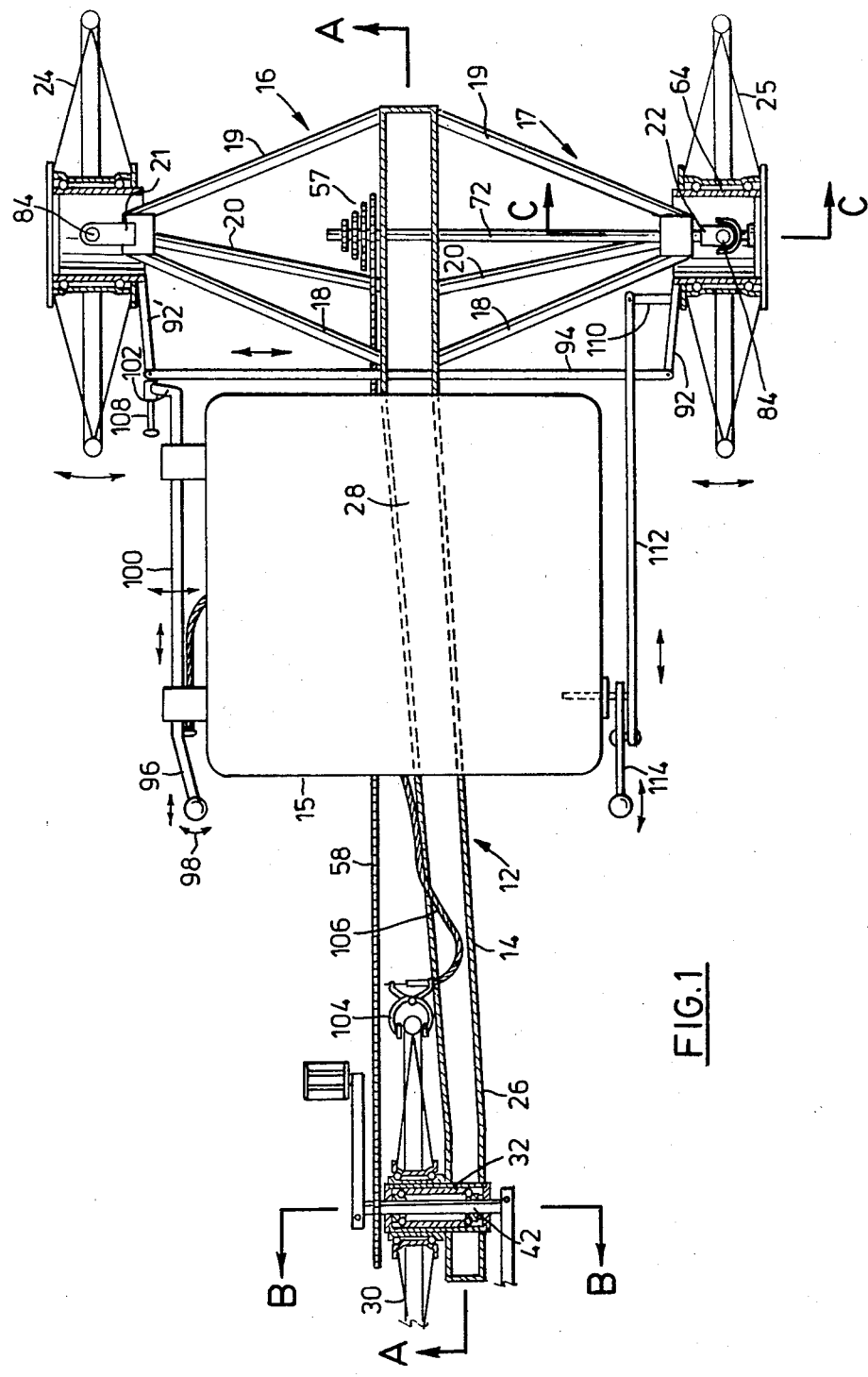

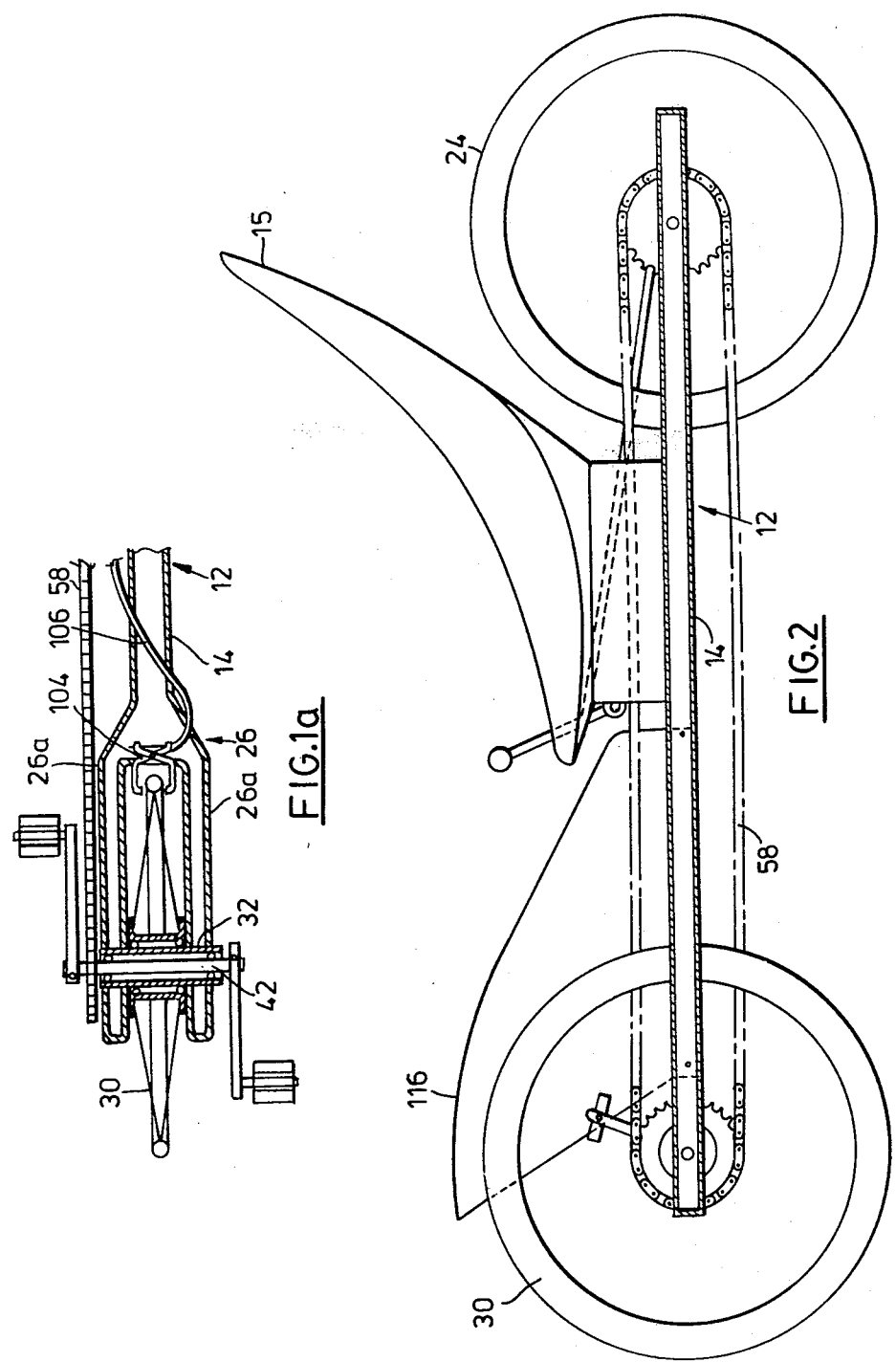

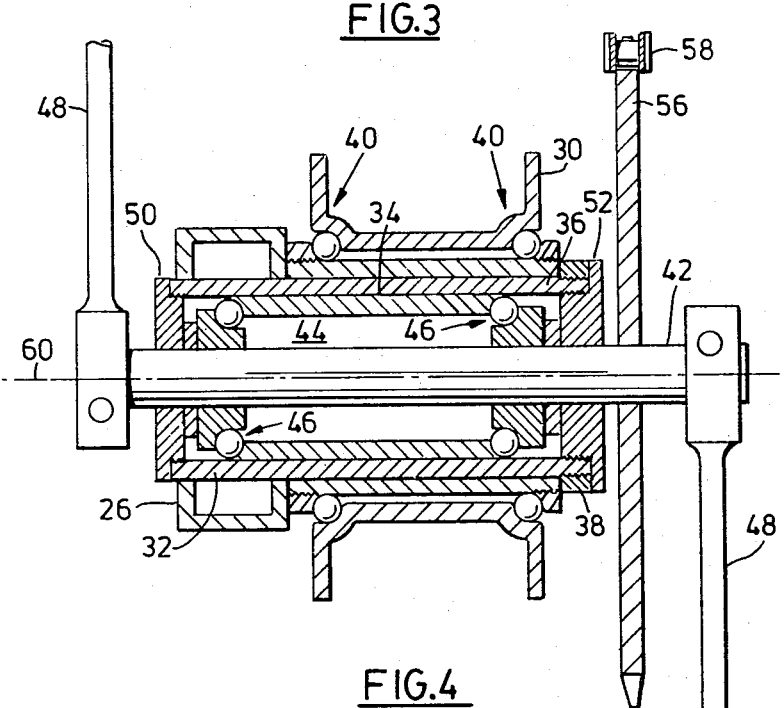
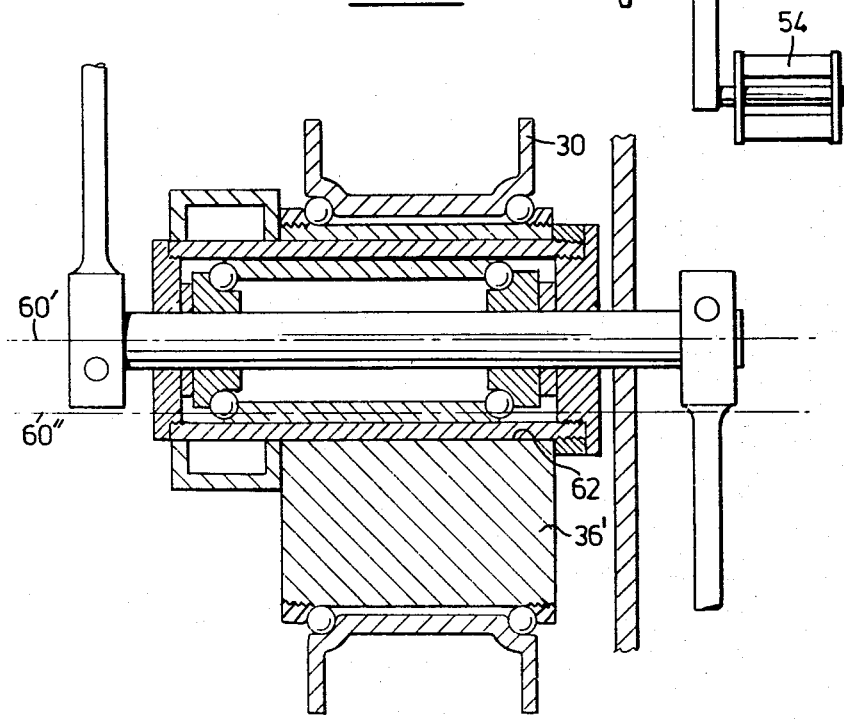

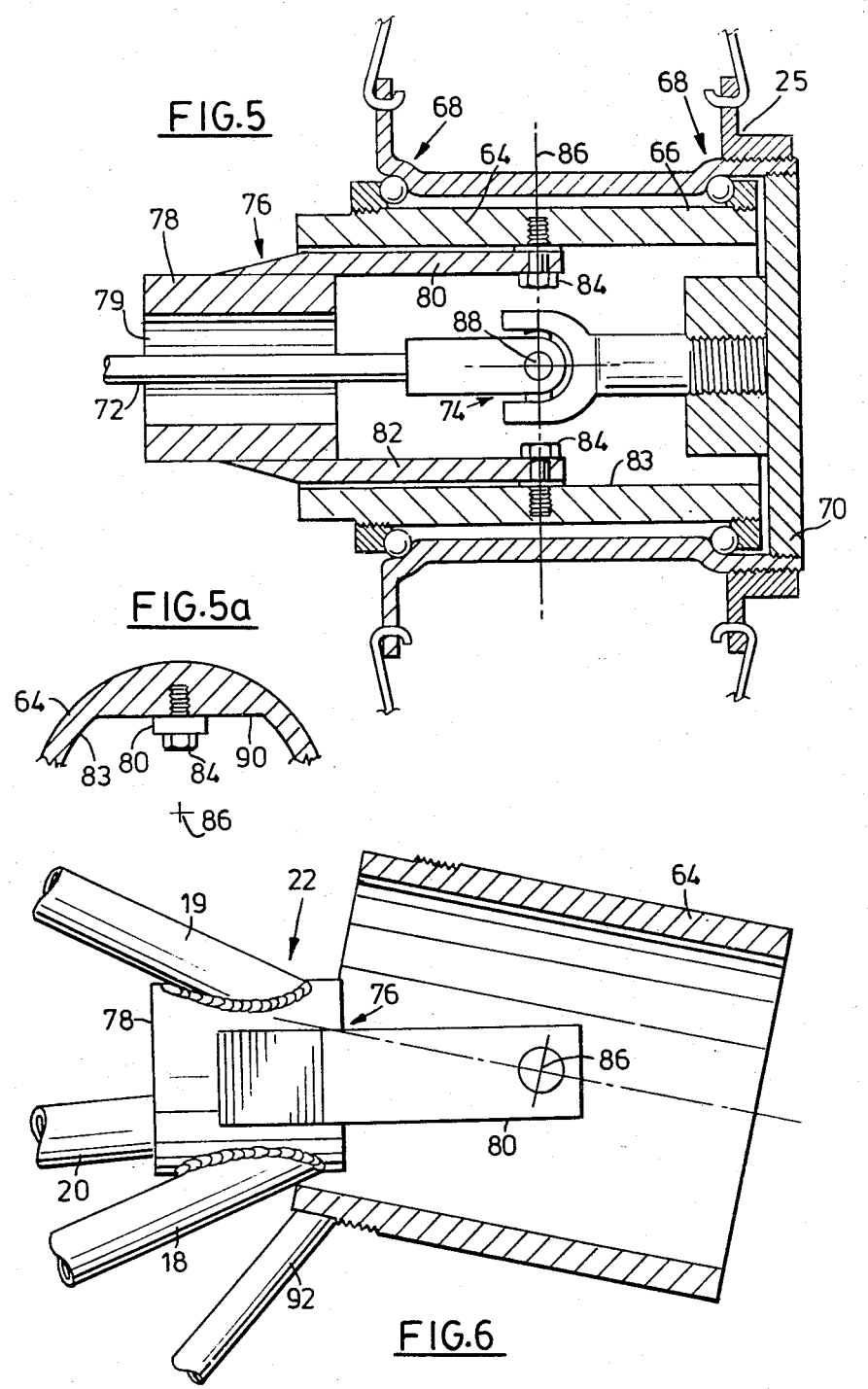

TRICYCLE

FIELD OF THE INVENTION

This invention relates to cycles and more particularly to tricycles which are operatively propelled by means of foot operable pedal cranks through a drive arrangement such as a sprocket and chain drive mechanism.

BACKGROUND OF THE INVENTION

Tricycles driven by foot operable pedal cranks through a sprocket and chain drive mechanism have heretofore been proposed.

It is known, for example, to provide a tricycle having one or more wheels coupled to foot operable pedal cranks through a sprocket and chain drive arrangement, and in which the foot pedal axle is positioned in an intermediate position in the tricycle frame. Generally in tricycles of this type the free-wheeling wheel or wheels are pivotable for steering the tricycle.

It is also known to provide a tricycle having a pivotable front wheel which is driven by foot pedal cranks whose axis of rotation passes through the wheel either concentrically with the wheel axis, or offset therefrom. In a tricycle of this type the front wheel is generally coupled with the pedal axle by a double sprocket and drive chain arrangement. Where foot pedal cranks are provided which are offset from the wheel axis separate pedal axles and driven mechanism are often required on each side of the wheel. The operator may be seated somewhat to the rear of the front wheel, the legs of the operator being positioned astride the wheel for cranking the pedals. In those cases where the operator's seat is considerably higher than the wheel axis, the legs of the operator may be able to avoid contacting the rim of the wheel when it is pivoted. However, this requires raising the centre of gravity of the cycle by an excessive amount, making it unstable. Reducing the size of the steerable front wheel will reduce the above problem but not eliminate it. In addition it is inconvenient to operate the foot pedals while pivoting the wheel from side to side.

In a tricycle designed for speed and efficient operation, it is highly desirable to seat the rider in a relatively low recumbent position between the front and rear wheels. This normally requires that the overall length of the wheelbase be extended in order to accommodate a conventional pedal arrangement behind the front wheel and which is easily accessible by the rider's feet.

Reduction of the overall length of the wheelbase without shifting the operator's weight dangerously to the rear may in accordance with the present invention, be advantageously accomplished through the provision of a freewheeling front wheel having a hub through which the pedal axle passes for interconnection with one or both rear wheels through, for example, a sprocket and chain drive arrangement.

Since the weight distribution will, in most cases, be predominantly on the rear wheels, it is desirable to provide an arrangement wherein both rear wheels are steerable, while at least one rear wheel is simultaneously driven through a sprocket and chain drive mechanism.

SUMMARY OF THE INVENTION

In accordance with the invention, there is provided a tricycle comprising a frame having front and rear end portions and a rider support seat, a pair of laterally spaced rear wheels journalled for rotation in the rear end portion of the frame, rider operable steering mechanism for pivoting the rear wheels for steering the tricycle, a single front wheel which has a central hub and which is mounted for free rotation on the front end portion of the frame, and rider operable means for driving at least one of said rear wheels and comprising drive means journalled for rotation independently of the front wheel about a horizontal axis which is disposed through the hub of said front wheel, driven means, and connection means so operatively connecting the driven means to said at least one rear wheel that said at least one rear wheel may be rotated by said driven means while being pivoted for steering of the tricycle, said drive means being provided with foot pedal cranks, and said drive and driven means being adapted to be engaged by a drive coupling for driving said driven means.

BRIEF DESCRIPTION OF THE DRAWINGS

FIG. 1 is a cross-sectional plan view of a tricycle in accordance with an embodiment of the invention;

FIG. 1a is a view corresponding to FIG. 1 of a portion of a tricycle in accordance with a preferred embodiment of the invention;

FIG. 2 is a cross-sectional side elevational view of the tricycle, cut-away along the line A—A of FIG. 1;

FIG. 3 is a cross-sectional view of the front wheel axle assembly of the tricycle shown in FIG. 1, on the line B—B therein;

FIG. 4 is a cross-sectional view corresponding to FIG. 3 of an alternate embodiment of the front wheel axle assembly;

FIG. 5 is a cross-sectional view of one of the rear wheel hub assemblies of the tricycle shown in FIG. 1, on the line C—C therein;

FIG. 5a is a fragmentary view of the hub assembly of FIG. 5;

and FIG. 6 is a fragmentary plan view of the hub assembly of FIG. 5.

DESCRIPTION OF THE PREFERRED EMBODIMENTS

Referring to FIGS. 1 and 2, a tricycle in accordance with the embodiment of the invention illustrated therein comprises a frame 12 of a generally cruciform configuration, including a longitudinal member or beam 14, preferably of tubular construction, a bucket seat 15 supportably mounted on the beam and a rear wheel support structure comprising a pair of opposed support members 16, 17, each member extending laterally on a respective side of the beam 14. Each said support member preferably comprises a pyramidal arrangement of tubular struts, including paired upper struts 18, 19 and a lower strut 20, each of which are welded to the beam 14 at their inner ends and to a wheel mount 21, 22 respectively at the outer ends, thereby forming a rigid wheel support structure.

Rear wheels 24, 25 are rotatably and pivotably mounted on their respective wheel mounts 21, 22 and spaced laterally from one another by a distance dictated by the particular application for which the tricycle is intended to be used, as will hereinafter be described.

The beam 14 has a front portion 26 which is laterally offset from the center line 28 of the frame, and a single front wheel 30 is mounted on one side of said front portion 26 and in line with the center line 28. In the alternative embodiment shown in FIG. 1a the front portion 26 of the beam 14 is in the form of a fork having a spaced limb portions 26a between which the front wheel is mounted as is conventional practice. This alternative embodiment shown in FIG. 1a is preferred in that it avoids the cantilever forces resultant from the front wheel being mounted on one side of the front portion 26 of the beam 14.

A tubular hub member 32 is rigidly mounted in the front end portion 26 of the frame, the front wheel 30 and a foot pedal axle 42 being rotatably mounted relative to said hub member 32 for rotation independently of one another as hereinafter described.

With reference to FIG. 3 the hub member 32 extends through the front portion 26 of the frame and is rigidly secured to the frame, for example, by welding. The front wheel 30 is mounted for free rotation on the exterior surface 34 of hub member 32. Preferably the front wheel includes a non-rotatable bearing member 36 which is mounted upon the exterior surface 34 and is secured by a retainer 38 threaded thereon. The wheel 30 includes a suitable friction reducing bearing assembly 40 which may be of conventional construction.

The foot pedal axle 42 extends through a bore 44 in the hub member 32 and is journalled for rotation on a suitable friction reducing bearing assembly 46 which may be of known construction and which may include dust covers 50, 52 to enclose the bore 44.

Pedal cranks 48 including foot pedals 54 are rigidly attached to the ends of the axle 42. A sprocket 56 is mounted for rotation with the axle 42 and is adapted to receive a drive chain 58 for driving the rear wheel.

It can be seen that the above construction enables the front wheel 30 and the pedal axle 42 to be rotated independently of each other, an important purpose of the aforesaid arrangement being to reduce the length of the wheelbase relative to that of conventional arrangements, wherein the pedal axle is mounted on the frame to the rear of the front wheel.

Preferably the front wheel 30 and pedal axle 42 are concentrically mounted for rotation about a common axis 60 as shown in FIG. 3. However, in certain cases it may be desirable to provide a front wheel of relatively small diameter, in which event a pedal crank of conventional length may make the arrangement of FIG. 3 impractical. Under such circumstances, it may be advantageous to raise the level of the pedal axis relative to the axis of the front wheel 30 to a height such that rotation of the crank will not cause the pedals or the heels of the operator's feet operatively to make contact with the ground. With this in mind, FIG. 4 shows an alternate arrangement of the front wheel 30 wherein there is provided a front wheel bearing member 36' to correspond to bearing member 36 of FIG. 3 but of increased diameter and providing a bore 62 whose axis 60' is radially offset from the wheel axis 60'' so as to permit the pedal axle 42 to be disposed above the wheel axis. The theoretical limit of the diameter of the wheel hub is governed solely by the wheel diameter. In practice however, friction will tend to be increased ceteris paribus in direct proportion to the hub diameter. It is, therefore, desirable to keep the hub diameter to a minimum.

The drive mechanism includes a drive shaft 72 journalled in the beam 14 and extending laterally to rotatably interconnect one of the wheels 25. It will be understood that although the drive shaft is shown in FIG. 1 coupled with only one wheel, this being preferred in normal and recreational applications, in certain other applications it is equally possible to interconnect both wheels with the drive shaft 72. In the latter cases, a splined shaft may be provided to allow for slight variations in its length due to pivotal movement of the wheels.

A drive sprocket arrangement 57, such as a conventional ten speed bicycle transmission mechanism, is mounted on the drive shaft adjacent the beam 14. The drive chain 58 interconnects the drive sprocket arrangement 57 with the foot pedal sprocket 56. Although a conventional drive mechanism comprising a sprocket and chain arrangement is preferred, it is equally possible to provided, for example, a belt and pulley drive mechanism in place of the chain and sprocket arrangement.

FIGS. 5, 5a and 6 illustrate details of the rear wheel hub and mounting arrangement. The hub 64 of each rear wheel is non-rotatable and includes an outer bearing surface 66 on which the wheel 24, 25 can be mounted for rotation upon suitable friction reducing bearings 68.

The driven wheel 25 is equipped with a cover 70 enclosing one end of the bearing 68 and thereby providing means for engaging drive shaft 72 extending axially through the hub 64. The drive shaft 72 is coupled to the wheel through a universal joint 74 or other flexible coupling means to permit the driven wheel to be pivoted.

Each wheel hub 64 is pivotally mounted upon a respective wheel mount 21, 22 each of which comprises a yoke 76 which includes an outer member 78 and a pair of fingers 80, 82 extending axially into the bore formed in the hub and pivotally attached to the hub by means of studs 84 through inner wall 83 to permit pivotal movement of the wheel about a vertical axis 86 which passes through the pivot point 88 of universal joint 74. Outer member 78 has a bore 79 formed therein through which the drive shaft 72 extends. The latter arrangement permits the wheel to be pivoted without inducing excessive friction in the steering and drive mechanism. If precise alignment of the universal joint 74 with pivot axis 86 proves to be impractical, it is possible to provide for example, a splined joint (not shown) in the drive shaft, whereby the latter will conform to the length required to overcome frictional forces due to pivoting of the wheel.

FIG. 5a illustrates the inner wall 83 configured to form a flat surface 90 upon which the hub can be pivoted about axis 86 upon the fingers 80, 82.

FIG. 6 is a plan view illustrating the arrangement of yoke 76 in relation to the rear wheel hub 64. Outer member 78 serves as a mounting to which upper struts 18 and lower strut 20 are welded to form a rigid mounting for the wheel. A steering link 92 is rigidly attached to the hub at a suitable location for connection with the steering linkage.

Referring again to FIGS. 1 and 2, two alternate steering mechanisms are shown. Both rear wheels are held at all times parallel by a tie rod 94, which interconnects steering links 92 and 92'.

Referring to the upper portion of FIG. 1, one version of manual steering level provides a hand lever 96 pivotable in the direction indicated by arrows 98 to pivot steering shaft 100 about its axis. A steering crank 102 is connected with the tie rod 94 to cause the latter to move laterally in response to pivotal movement of the hand lever 96, thereby causing the wheels 24, 25 to be pivoted.

Braking of the tricycle may, for example, be accomplished by a conventional caliper type friction brake 104 provided for the front wheel and if desired for the rear wheels. The brake 104 is activated by a conventional cable and sheath assembly 106 which may be connected to a hand grip of conventional manufacture (not shown) or to the steering shaft 100 such that sliding movement of said shaft in the axial direction activates the caliper brake. In the latter case, it is necessary to allow for movement of the shaft 100 relative to the tie rod 94, by providing, e.g. a tie rod end 108 extending parallel to shaft 100, upon which crank 102 can slide.

Referring to the lower portion of FIG. 1 and to FIG. 2, an alternate embodiment of the steering assembly is illustrated wherein a steering bracket 110 rigidly attached to the steering link 92 provides a pivotal attachment for a steering rod 112 which is adapted to be moved longitudinally by hand lever 114.

It will be understood that various configurations of the tricycle described hereinbefore can be provided without departing from the invention. For example, the length of the wheelbase can be altered as may be required for various purposes. In the embodiment shown in FIG. 2, a relatively long wheelbase and relatively low seat are illustrated to allow the operator to assume a generally recumbent position suitable for racing.

If desired, an auxiliary motor drive mechanism (not shown) may be provided to be operatively coupled to the drive shaft at will. Suitable means for simultaneously disengaging the foot pedal cranks 48 when engaging the motor drive mechanism may also be provided if required.

In normal, recreational or other applications, it may be desirable to further reduce the length of the wheelbase and to raise the level of the seat to a more normal seating level. A front wheel guard 116 (FIG. 2) of suitable construction may be provided to protect the legs of the operator from contact with the front wheel and drive chain, and although not illustrated, an enclosure (body canopy) or a trunk compartment disposed between the rear wheels 24, 25 and constructed, for example, of resin impregnated glass fiber material can be provided.

I claim:

1. A tricycle comprising:
   a frame having front and rear end portions and a rider support seat, a pair of laterally spaced rear wheels journalled for rotation in the rear end portion of the frame, rider operable steering mechanism for pivoting the rear wheels for steering the tricycle,
   a single front wheel which has a central hub and which is mounted for free rotation on the front end portion of the frame, and
   rider operable means for driving at least one of said rear wheels and comprising drive means journalled for rotation independently of the front wheel about a horizontal axis which is disposed through the hub of said front wheel, driven means, and connection means so operatively connecting the driven means to said at least one rear wheel that said at least one rear wheel may be rotated by said driven means while being pivoted for steering of the tricycle,
   said drive means being provided with foot pedal cranks, and said drive and driven means being adapted to be engaged by a drive coupling for driving said driven means.

2. A tricycle as claimed in claim 1, wherein said drive means comprises a drive sprocket, said driven means comprises a driven sprocket, and said drive coupling comprises a drive chain.

3. A tricycle as claimed in claim 2, wherein said front end portion of the frame is provided with a rigid hub member, inner and outer bearings being provided on said hub member, said front wheel being mounted for rotation on said outer bearing, and said drive sprocket being journalled in the inner bearing.

4. A tricycle as claimed in claim 3, wherein the inner and outer bearings are coaxial.

5. A tricycle as claimed in claim 3, wherein the inner bearing axis is above the outer bearing axis.

6. A tricycle as claimed in claim 2, wherein said connection means comprises a drive shaft which extends laterally from the driven sprocket to said at least one rear wheel, the drive shaft providing a flexible coupling whereby said at least one rear wheel may be pivoted about a substantially vertical axis.

7. A tricycle as claimed in claim 6, wherein the flexible coupling is a universal joint arranged coaxially with the pivot axis of said one rear wheel.

8. A tricycle as claimed in claim 2, wherein the frame comprises a generally longitudinal frame member and lateral support struts rigidly mounted on the rear end portion thereof, said struts terminating in mounting means on which said rear wheels are pivotally mounted.

9. A tricycle as claimed in claim 1, wherein said front end portion of the frame comprises a fork having spaced limb portions between which the front wheel is disposed.

* * * * *